United States Patent [19]

Glenn et al.

[11] Patent Number: 4,622,775
[45] Date of Patent: Nov. 18, 1986

[54] HYDROPONIC PLANT COLLARS

[75] Inventors: Edward P. Glenn; Frank Gething, both of Tuscon, Ariz.

[73] Assignee: Kraft, Inc., Glenview, Ill.

[21] Appl. No.: 721,493

[22] Filed: Apr. 9, 1985

Related U.S. Application Data

[63] Continuation of Ser. No. 445,655, Nov. 30, 1982, abandoned.

[51] Int. Cl.⁴ ............................................. A01G 31/00
[52] U.S. Cl. ............................................. 47/63; 47/77
[58] Field of Search ............... 47/63, 59, 66, 64, 73, 47/77, 65, 87, 86, 85, 60, 61, 62; 220/238

[56] References Cited

U.S. PATENT DOCUMENTS

| | | | |
|---|---|---|---|
| 2,189,510 | 2/1940 | Swaney | 47/1.2 |
| 3,467,600 | 9/1969 | Adams et al. | 260/17.4 |
| 3,927,491 | 12/1975 | Farnsworth | 47/1.2 |
| 4,006,558 | 2/1977 | Neddo et al. | 47/77 |
| 4,037,360 | 7/1977 | Farnsworth | 47/63 |
| 4,075,785 | 2/1978 | Jones | 47/64 |
| 4,161,844 | 7/1979 | Hentschel et al. | 47/62 |
| 4,192,097 | 3/1980 | Smith | 47/59 |
| 4,279,101 | 7/1981 | Leroux | 47/64 |

FOREIGN PATENT DOCUMENTS 12354 of 1896 United Kingdom ................... 47/66

Primary Examiner—Robert A. Hafer
Assistant Examiner—Bradley M. Lewis
Attorney, Agent, or Firm—Fitch, Even, Tabin & Flannery

[57] ABSTRACT

Collars, for supporting plants by the base of their stems with the major portion of the root structure extending downward into an aqueous hydroponic medium, have upstanding sidewalls and bottom end structures that support the plant while leaving at least about 75 percent of the bottom area open for the roots to extend through. The collars are very small having a volume less than about one tenth that which would normally be considered adequate to conventionally culture plants in a solid support medium. Vertical foils extend radially inward from the sidewall to prevent the roots, in their early stages of development, from spiraling around the sidewall.

13 Claims, 6 Drawing Figures

U.S. Patent  Nov. 18, 1986  4,622,775
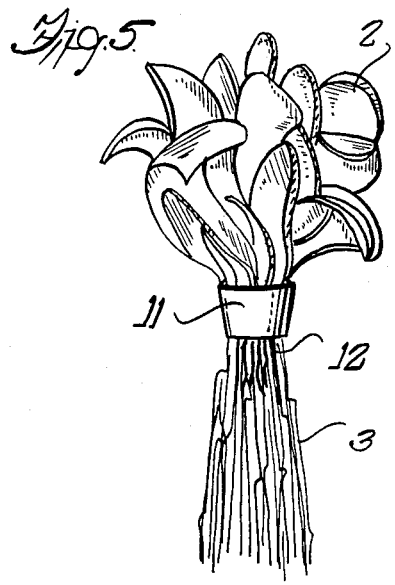
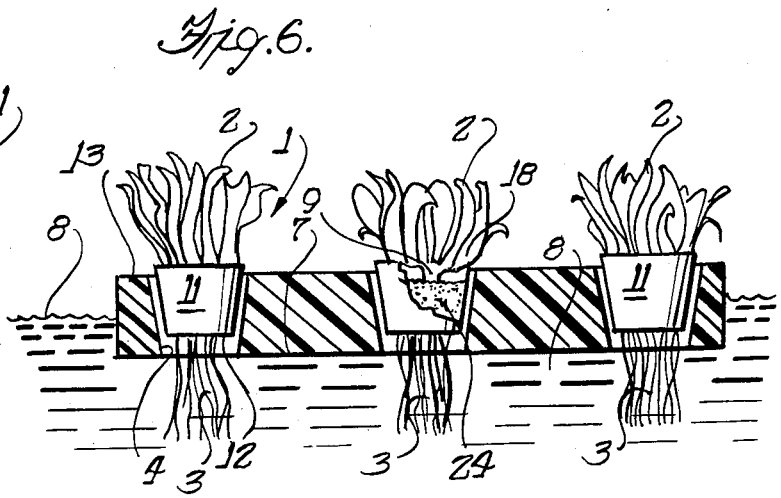
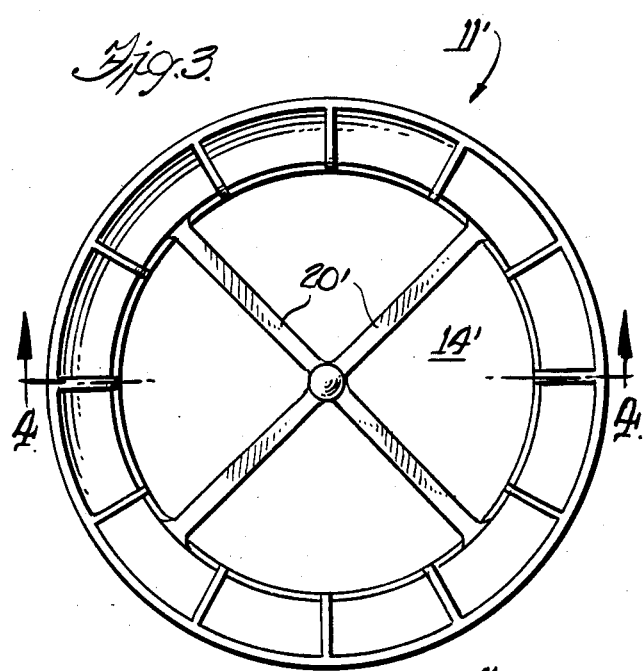
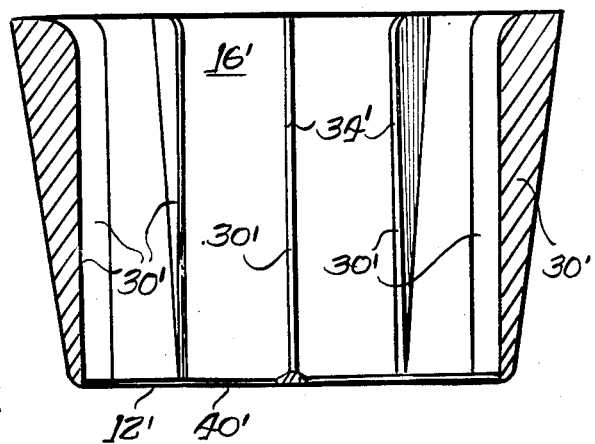
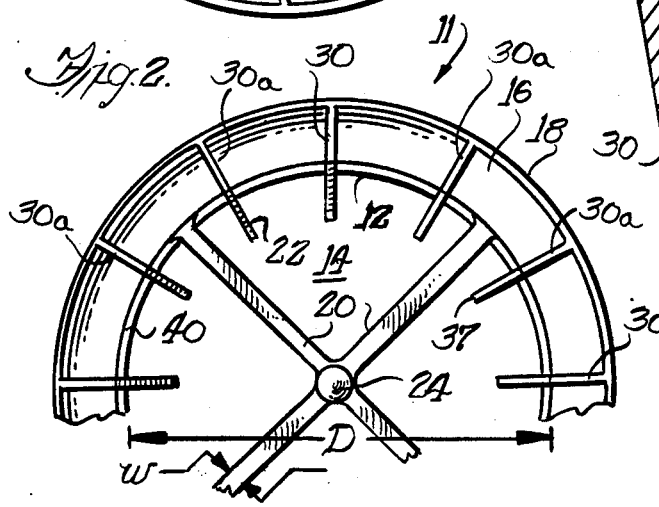
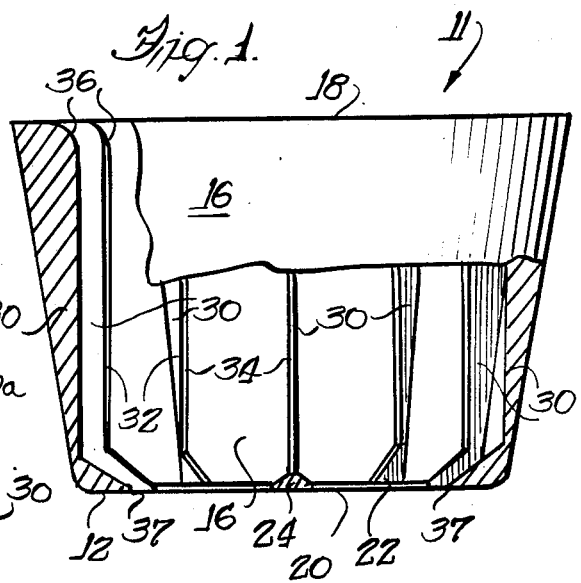

HYDROPONIC PLANT COLLARS

This application is a continuation, of application Ser. No. 445,655, filed Nov. 30, 1982, now abandoned.

The present invention relates to hydroponic farming and more particularly to containers in which plants can be grown with their roots in communication with an aqueous nutrient medium and their foilage supported above the surface of the aqueous medium.

BACKGROUND OF THE INVENTION

Considerable experimentation and development in water culture or hydroponic culture has brought the art to where some plants, particularly adaptable to hydroponic culture, are commercially hydroponically cultured to a limited extent, and it is expected that significant portions of certain plants might soon be hydroponically grown. A major advantage of hydroponic culture, is that through the use of efficient systems, the yield per unit space can be substantially greater than that achievable with conventional seasonal, soil-based agriculture. Generally optimal growth conditions can be maintained at all times, thereby shortening the growing period from germination to maturity. Space efficiency can be maximized by rearranging the hydroponically grown plants, whose root structures are not permanently embedded in a stationary solid support. Furthermore, because hydroponic farming is generally effected in sheltered environments, e.g., greenhouses, farming is continuous throughout the year.

The recognized advantages of hydroponics must, however, be weighed against the costs of hydroponic farming, particularly initial capital costs, but also the cost of energy needed to operate a hydroponic system, the cost of nutrients which must all be supplied artificially, and substantial labor costs. An example of labor costs in efficient hydroponic systems is the labor required to rearrange plants to maximize space efficiency as the plants mature. To the extent that these costs can be reduced, the greater is the efficiency of a hydroponic system.

Compensating for any additional cost in raising plants hydroponically is that the plants may frequently be marketed in a much fresher condition. Hydrophonic farming may be carried out during all seasons in close proximity to the place of marketing. Furthermore, the entire hydroponically grown plants, including their roots, may be transported intact to market, whereby the entire live plant, and not merely its severed members, may be sold. For plants, such as certain leafy vegetables, whose foilage tends to wilt quickly after harvest, the ability to market the growing plant contributes significantly to its shelf life and its freshness as delivered to the consumer.

Hydroponic systems require some means for supporting plants in their upright orientation during their growing cycle, and pots of various types have been used in hydroponic systems. Conventional plant pots have been utilized in hydroponic farming, but more specialized plant supporting means have also been developed. U.S. Pat. No. 4,161,844 describes a plant pot for hydroculture having a compartment that contains fertilizer for nourishing the plant during its growth cycle. U.S. Pat. No. 3,927,491 describes a plant-supporting raft which may be floated on the surface of an aqueous nutrient medium. U.S. Pat. No. 4,037,360 describes a variation of such a raft having collapsible walls which naturally enlarge the space in the raft available for foilage as the plant grows.

A plant-supporting collar should be designed to promote rapid plant growth and thereby tend to maximize efficiency of the hydroponic farming operation. The collars are generally intended to be disposable because typically the hydroponically grown plant will be marketed as a still-living plant with at least a portion of its root structure intact and with the collar still surrounding the base of its stem, and therefore, the collar should be very inexpensive.

SUMMARY OF THE INVENTION

A plant collar is provided for hydroponic culture having an upstanding sidewall and a lower end which is substantially open except for a minimal structure which holds the plant by the base of its stem along with a minimal amount of solid support material. The collar is tiny relative to conventional plant pots and is intended only to hold the base of the stem and the root portion attached thereto with the major portion of the root structure extending below the open lower end. A tendency of plant roots to spiral around the sidewall of the collar is overcome by providing vertical foils extending inward from the sidewall of the collar.

BRIEF DESCRIPTION OF THE DRAWINGS

FIG. 1 is an elevation view, partially cut away, of a plant collar embodying various features of the present invention;

FIG. 2 is a partial plan view of the collar of FIG. 1;

FIG. 3 is a plan view of a further embodiment of a plant collar;

FIG. 4 is a cross-sectional view taken along line 4—4 of FIG. 3;

FIG. 5 is a perspective view of a collar of either FIG. 1 or 3 containing a plant; and FIG. 6 is a cross-sectional view of a raft carrying a plurality of plant-containing collars.

DETAILED DESCRIPTION OF THE PREFERRED EMBODIMENTS

The pot or collar 11 described herein supports the stem of a growing plant 1 (FIG. 5) from seed to maturity with its foilage 2 extending above the collar and the major portion of its roots 3 extending downward from the collar. The collar 11 was specifically developed for placement in openings 4 of a Styrofoam raft 7 which floats on the surface of an aqueous nutrient medium 8 so that the lower end 12 of the collar 11 dips into the medium and its foilage 2 grows above the upper surface 13 of the raft. However, the use of the collar 11 is not limited to this particular method of hydroponic farming and embodies features which are generally advantageous to the growth of hydroponically cultured plants.

Although the invention is embodied in collars 11 adapted for supporting plants 1 during their entire growth cycle in a hydroponic culture system, the collars should not be confused with pots that are adapted for growing plants in soil or the like and which have sufficient volume for containing the entire root structure of the plant. Instead, the collar is only large enough to hold a small amount of plant-supporting solid material in which a seed is germinated. Soon after germination, the roots of the seedling extend through the lower end 12 of the collar, which provides a very substantial open area 14 (FIG. 2) at its lower end, to draw nutrient from the aqueous hydroponic medium 8. As the plant 1 matures, only the base of the stem 9 (FIG. 6) and a small portion of the attached root structure 3 is within the collar 11 while the major portion of the root structure extends through the open area 14 at the bottom of the collar.

The very small size of the collar 11 allows it to be produced very cheaply using minimal material in its manufacture. The exact size of the collar depends upon the particular plant that is to be grown therein and the particular hydroponic system, however, the collar will typically have less than about one-tenth the volume which would be required to contain the entire root structure 3 of the mature plant 1. As an example of the small size of the collar, a collar for Bibb lettuce plant might be approximately two inches in diameter at the top and just over an inch high.

Although it is conventional in a plant pot to have an opening or openings in its bottom to promote drainage of the soil, the percentage of the total bottom area which this open area conventionally represents is usually quite minimal, whereas the collar 11 is designed to generally maximize the open area in the lower end so that the root structure 3 growing through the open end 14 of the small collar 11 is not constricted, and for purposes of this invention, the open area at the bottom of the collar 11 of the present invention is at least about 75 percent of the total area of the bottom of the collar and preferably is at least about 85 percent of the total bottom area. Those structures which impinge on the open bottom area are provided only for structural strength of the collar 11, for molding purposes and for holding a plant and solid support material.

The sidewall 16 of the illustrated collar 11 is frusto-conical being larger at its upper end 18 than at its lower end 12. This permits the collar to be held in a frustoconical opening 4 of floating raft 7 or other exterior support having a round opening as shown in FIG. 6. Its circular cross section permits the collar to be conveniently placed in the round opening 4 without regard to rotational orientation. Typically the sidewall 16 angles from the vertical by between about 5° and about 20°.

The bottom of the collar consists merely of a pair of cross struts 20 extending diametrically across the lower end 12 of the sidewall 16 and certain auxiliary protrusion 22 extending inward from the sidewall. The cross struts 20 are very narrow relative to the diameter of the lower end 12, the struts typically have a width (W) (FIG. 2) less than about one-eighth the diameter (D) of the lower end. In the illustrated collar 11, two cross struts 20 meet at the center where their junction is reinforced by a dome-shaped protruberance 24. The regions of a mold in which the struts 20 are formed serve as conduits during injection molding of the collar, polymeric material, such as polypropylene, being injected into the mold in the region of the dome 22 at the junction of the cross struts.

Plants are generally germinated in a small amount of loose solid support material 24 (FIG. 6), such as peat, sphagnum moss or vermiculite, before being advanced to a true hydroponic culture. Typically, plant collars 11 are initially filled with the solid support material, seeded and placed in trays supplied with nutrient solution until the seeds have germinated and the seedlings have established a root structure, stem and early foilage. If the support material is loose, the root structure of the seedling holds the particles of solid material together so that the material is not loose and does not fall through the open bottom area 14 when the plant is transferred for hydrophonic culturing. Mesh-wrapped support material, such as peat pellets, may also be used.

Initially, it was thought to be most convenient to use collars having smooth interior sidewalls; however, it was noticed that as the root structure of the seedlings developed, there was a tendency for the roots to grow to the sides of the collar and then spiral around the sidewall of the collar. This proved to be a poor beginning root structure for the plants and tended to retard later development of the plant.

An important aspect of the present invention is means in the form of vertical foils 30 along the sidewall 16 of the collar 11 to prevent spiraling of the roots around the collar. The roots, which reach the sidewall 16 and begins spiraling, are deflected by the foils 30 and tend to grow downward in an untangled manner. Herein, twelve such foils 30 are illustrated, evenly spaced from each other. The foils 30 are also arranged symmetrically relative to cross struts 20, the flanking foils 30a being spaced about 15° from the cross struts. The foils 30 have flat side surfaces 32 and are about as thick between their side surface or slightly thicker than the sidewall 16. A radially inner edge 34 of each foil 30 is substantially vertical, extending along a line which runs closely adjacent to the lower end 12 of the sidewall, resulting in foils which are broad (in the radial direction) at their upper end and narrower toward their lower end. The upper inner corners 36 of the foils are curved so as not to poke the hand of a worker who inserts the support material. The lower ends of the foils angle radially inward from the otherwise vertical inner edge 34 providing auxiliary protrusions 22 that help to retain the plant support material. The protrusions 22 may also help to assure that the roots growing downward along the sidewall 16 grow directly downward through the open bottom area 14. The inner ends 37 of these auxiliary protrusions 22 extend about one third to about one half the distance to the axial center as measured from the lower end of the sidewall 16. An annular, inwardly extending rib 40 (FIG. 2) at the lower end 12 of the sidewall 16 reinforces the lower end. This rib 34 extends inward only about one sidewall thickness, minimally intruding into the open area at the lower end of the collar and presenting substantially no obstruction to the continued direct growth downward of the roots growing downward along the sidewall between the foils.

In developing the collars of the present invention, it was found that additional inward obstructions, such as an annular inwardly extending ledge at the lower sidewall end, significantly interfered with the unconstricted downward growth of the root structure and thereby reduced the size of the mature plant.

Illustrated in FIG. 3 is a collar 11' that is a modification of the collar 11 of FIG. 1. In this embodiment, no auxiliary protrusions are present, and the open bottom area 14' is slightly larger. When a mesh-wrapped pellet is used as the solid support material, the auxiliary protrusions are unneeded. Also, if the seedling is allowed to develop a sufficient root structure for holding together loose support material, no protrusions are needed. In this embodiment of the collar 11', the inner edges 34' of the foils 30' that extend inward from the sidewall 16' meet the bottom rib 40' at the lower end 12'.

EXAMPLE

The following experiment was conducted to determine whether the design of the collar could contribute to the development of the hydroponically grown plant and what solid support material is most advantageous. The cups tested were: (A) the cup described with reference to FIG. 1 formed of Exon 1024 polypropylene and having a 1½ inch upper diameter, a 1⅛ inch lower diameter, a 1¼ inch depth, an 86 percent open bottom area, and 12 vertical foils; (B) an earlier model of collar A having a bottom shelf extending inward to the ends of the auxiliary protrusions; and (C) a cup manufactured by Lilly used to administer pills having a frustaconical sidewall, with a 1 inch depth, a 1¼ inch upper diameter, a 1 inch lower diameter, a bottom cut away and no vertical foils. Support materials tested include: vermiculite, peat pellets (compacted peat wrapped in mesh), a material sold under the trademark Redi-Earth, and Perlite.

Bibb Lettuce plants were germinated in individual collars kept in trays until an age of two weeks and then the plant-containing collars were transferred to Styrofoam rafts having frustaconical openings in a 6×8 array with 6.8"×6.8" rectangular spacing. These rafts were floated in raceways filled with nutrient solution, the rafts supporting the collars with their lower ends dipping into the solution. The plants in each tray being raised under identical conditions. After 6 weeks (4 weeks in the nutrient solution) the plants were harvested, the heads weighed and the leaf quality noted. Leaf quality was judged by visual determination on a scale from 1 to 9 with the major detraction from leaf quality being bolting of the leaves. The results are as follows:

|  | Fresh weights of lettuce heads | | |
| --- | --- | --- | --- |
|  | x̄ | σ | Quality |
| no cups-peat pellets | 126.1 | 21.7 | 5.0 |
| Cup C-peat pellets | 123.8 | 12.9 | 5.4 |
| Cup C-vermiculite | 123.4 | 20.1 | 5.1 |
| Cup B-peat pellet | 123.4 | 12.2 | 5.2 |
| Cup A-peat pellet | 145.3 | 26.5 | 5.4 |
| Cup B-Redi-Earth | 129.4 | 20.4 | 5.4 |
| Cup B-Perlite | 91.8 | 29.9 | 5.0 |
| Cup B-vermiculite | 97.6 | 27.5 | 5.0 |

The above results demonstrate that Cup A, having a very substantial open bottom area and vertical foils significantly increased the size of the heads, i.e., by least 11.5 percent, over either of the other cups tested with any support material. Substantial spiraling of the root structure was found in cup C which is believed responsible for the decreased size of the heads with respect to those grown in collar A. In collar B, the foils prevented root spiraling, but the roots growing downward along the sidewall and between the foils were deflected inward by rhe shelf at the bottom, and the obstruction presented by the shelf was believed responsible for the smaller heads of the plants grown in this collar. The root structure in collar A was not spiraled and the roots which grew to the sidewall and were deflected downward continued to grow directly through the lower end. Peat pellets, which are very convenient for large-scale production, were found to produce generally as good results as any other solid support material.

While the invention has been described in terms of a preferred embodiment, modifications obvious to one with ordinary skill in the art may be made without departing from the scope of the invention.

Various features are set forth in the following claims.

What is claimed is:

1. A collar molded as a unitary structure for hydroponic culture adapted for supporting a plant by the base of its stem and a small portion of the root structure attached thereto, the collar comprising
   a frustoconical upstanding sidewall having a broader upper end and a narrower lower end,
   plant supporting cross struts at said lower end,
   a plurality of vertical foils extending inward from said sidewall and downward to said lower end to prevent the roots of the plant from spiraling around said sidewall,
   said foils each having parallel side surfaces and a substantially vertical inner edge extending along a line which runs closely adjacent to said lower end of said sidewall, and
   said foils having protrusions at their lower ends which extend radially inward for retaining solid plant-supporting material within said collar,
   said struts and said inwardly extending protrusions leaving an open bottom area equal to at least about 75 percent of the area of said lower end to allow the major portion of the roots of the plant, at maturity, to extend therethrough into an aqueous nutrient medium, and said collar presenting substantially no obstruction to direct downward growth of plant roots between said vertical foils.

2. A collar according to claim 1 having an open bottom area equal to at least about 85 percent of the area of said lower end.

3. A collar according to claim 1 wherein said foils have rounded upper ends.

4. A method of hydroponically growing a plant comprising
   providing a collar adapted for supporting the plant at maturity by the base of its stem and a small portion of its root structure, said collar having a frustoconical upstanding sidewall having a broader upper end and a narrower lower end and bounding a volume less than about one-tenth of the pot volume required for the root structure of the plant at maturity if grown conventionally with its roots all contained within a solid support medium, said collar having plant-supporting struts at said lower end, said collar having a plurality of vertical foils extending inward from said sidewall and downward to said lower end for preventing the roots of the plant from spiralling around said sidewall, said foils each having parallel side surfaces and a substantially vertical inner edge extending along a line which runs closely adjacent to said lower end of said sidewall, said foils having protrusions at their lower ends which extend radially inward for retaining solid plant-supporting material within said collar, said collar having an open bottom area equal to at least about 75 percent of the area of said lower end to allow the major portion of the roots of the plant to extend therethrough into an aqueous nutrient medium, said collar presenting substantially no obstruction to downward growth of plant roots between said vertical foils,
   filling said plant collar with a solid support medium,
   planting a plant in said solid support medium,
   at an early stage of the development of said plant, supporting said plant-containing collar so that said lower end of said sidewall extends into an aqueous nutrient medium and said upper end of said sidewall extends above the surface of said aqueous nutrient medium, and cultivating said plant to maturity supported by said collar in aqueous nutrient media.

5. A collar molded as a unitary structure for hydroponic culture adapted for supporting a plant by the base of its stem and a small portion of the root structure attached thereto, the collar comprising a frustoconical upstanding sidewall having a broader upper end and a narrower lower end, said sidewall being angled from the vertical by between about 5° and about 20°, a pair of plant-supporting cross struts at said lower end, said cross struts each having a width less than about one-eighth the diameter of the lower end of said sidewall, a plurality of evenly spaced vertical foils extending inward from said sidewall and downward to said lower end to prevent the roots of the plant from spiralling around said sidewall, said foils each having parallel side surfaces and a substantially vertical inner edge extending along a line which runs closely adajcent to said lower end of said sidewalls, said foils being approximately one sidewall thickness, said foils having protrusions at their lower ends which extend radially inward for retaining solid plant-supporting material within said collar, said foils having rounded upper ends, and a circumferential rib at said lower end of said sidewall for reinforcing the same, said rib extending inward to more than about one sidewall thickness so as to present substantially no obstruction to direct downward growth of plant roots between said vertical foils, said struts, said rib and said inwardly extending protrusions leaving an open bottom area equal to at least about 75 percent of the area of said lower end to allow the major portion of the roots of the plant at maturity to extend therethrough into an aqueous nutrient medium.

6. Apparatus for hydroponically culturing a plurality of plants in an aqueous medium comprising a plurality of collars, each collar molded as a unitary structure and each having a frustoconical upstanding sidewall having a broader upper end and a narrower lower end, integrally formed means at the lower end for holding solid support material and a growing plant while leaving an open bottom area equal to at least about 75 percent of the area of said lower end to allow the major portion of the roots of the plant at maturity to extend therethrough into the aqueous medium, a plurality of vertical foils extending inward from said sidewall and downward to said lower end to prevent the roots of the plant from spiralling around said sidewall wherein said foils are substantially planar projections, each having parallel side surfaces and a vertical inner edge extending along a line running closely adjacent to said lower end, said collar presenting substantially no obstruction to direct downward growth of plant roots between said vertical foils, and means to supporting said plurality of collars plus said solid support material and plants growing therein at the surface of said aqueous medium, said supporting means having a plurality of openings, each opening having a frustoconical surface matched to that of said collar sidewall for receiving the collar with its lower end extending into aqueous medium.

7. Apparatus according to claim 6 wherein said means for supporting is a raft having sufficient buoyancy for floating on the surface of said aqueous medium, supporting said collars and the plants growing therein.

8. Apparatus according to claim 6 wherein said foils each has a rounded upper edge.

9. Apparatus according to claim 6 wherein said holding means comprises cross struts extending across the bottom end of said collar.

10. Apparatus according to claim 9 wherein a pair of cross struts are provided at said lower end, the width of each being less than about one-eighth the diameter of said bottom end.

11. Apparatus according to claim 6 in combination with a reservoir for aqueous medium.

12. Apparatus according to claim 6 wherein said frustoconical sidewall angles from the vertical by between about 5° and about 15°.

13. Apparatus for hydroponically culturing a plurality of plants in aqueous medium comprising reservoir means for containing aqueous medium, a plurality of plant collar each of said collars being molded as a unitary structure adapted for supporting a plant by the base of its stem and a small portion of the root structure attached thereto, each collar having a frustoconical upstanding sidewall having a broader upper end and a narrower lower end, said sidewall being angled from the vertical by between about 5° and about 20°, a pair of plant-supporting cross struts at said lower end, said cross struts each having a width less than about one-eighth the diameter of the lower end of said sidewall, a plurality of evenly spaced vertical foils extending inward from said sidewall and downward to said lower end to prevent the roots of the plant from spiralling around said sidewall, said foils each having parallel side surfaces and a substantially vertical inner edge extending along a line which runs closely adjacent to said lower end of said sidewalls, said foils being approximately one sidewall thickness, said foils having protrusions at their lower ends which extend radially inward for retaining solid plant-supporting material within said collar, said foils having rounded upper ends, and a circumferential rib at said lower end of said sidewall for reinforcing the same, said rib extending inward no more than about one sidewall thickness so as to present substantially no obstruction to direct downward growth of plant roots between said vertical foils, said struts, said rib and said inwardly extending protrusions leaving an open bottom area equal to at least about 75 percent of the area of said lower end to allow the major portion of the roots of the plant at maturity to extend therethrough into an aqueous nutrient medium, and raft means having sufficient buoyancy for floating on the surface of said aqueous medium for supporting said plurality of collars as well as solid support material and plants growing therein at the surface of the aqueous medium, within said reservoir means, said supporting raft means having a plurality of openings, each opening having a frustoconical surface matched to that of said collar sidewall for receiving the collar with its lower end extending into the aqueous medium.

* * * * *